United States Patent [19]

Lieberman

[11] Patent Number: 5,720,039
[45] Date of Patent: Feb. 17, 1998

[54] SATELLITE MULTIPLE ACCESS SYSTEM WITH DISTORTION CANCELLATION AND COMPRESSION COMPENSATION

[75] Inventor: Daniel Lieberman, Washington, D.C.

[73] Assignee: CD Radio, Inc., Washington, D.C.

[21] Appl. No.: 742,743

[22] Filed: Nov. 1, 1996

Related U.S. Application Data

[62] Division of Ser. No. 523,012, Sep. 1, 1995.

[51] Int. Cl.$^6$ .................................................. H04B 1/62
[52] U.S. Cl. ........................... 455/10; 455/13.2; 455/63; 455/115; 370/317; 370/319; 375/285; 375/296
[58] Field of Search .................................. 455/8, 9, 10, 63, 455/65, 115, 295, 296, 17, 24, 69, 70, 13.4, 13.2, 12.1

[56] References Cited

U.S. PATENT DOCUMENTS

| | | | |
|---|---|---|---|
| 4,038,600 | 7/1977 | Thomas | 455/13.4 |
| 5,015,965 | 5/1991 | Katz et al. | 330/149 |

*Primary Examiner*—Reinhard J. Eisenzopf
*Assistant Examiner*—Lee Nguyen
*Attorney, Agent, or Firm*—Patrick F. Bright

[57] ABSTRACT

A multicarrier satellite communications system includes one or more satellites and one or more transmitters at generally terrestrial locations that transmit a plurality of signal carriers to the satellites which contain non-linear signal repeaters that produce inter-modulation noise or signal compression in the signal carriers. The noise is minimized/cancelled by adding to the signal carriers, at the generally terrestrial locations where the transmitters are located, noise-cancelling or signal compression-correcting signals.

6 Claims, 12 Drawing Sheets

SATELLITE MULTIPLE ACCESS SYSTEM WITH DISTORTION CANCELLATION AND COMPRESSION COMPENSATION

This application is a division of U.S. patent application Ser. No. 08/523,012, filed Sep. 1, 1995, which "SATELLITE MULTIPLE ACCESS SYSTEM WITH DISTORTION CANCELLATION AND COMPRESSION COMPENSATION" by Daniel J. Lieberman.

BACKGROUND OF THE INVENTION

The present invention is directed to satellite communications systems, and more particularly to methods and apparatus for cancelling inter-modulation noise and compensating for signal compression in multi-access systems that operate in a non-linear region of a satellite transponder.

In known multi-carrier satellite communications systems, signal levels are reduced to avoid transponder oversaturation. For example, if a single channel saturates a satellite transponder, then adding an additional signal, requires reducing the powers of each of the two channels by at least three (3) dB, or half-power, to maintain total system power at saturation and prevent transponder over-saturation. In addition, since, in a multi-carrier system, the transponder non-linearity generates intermodulation products, sometimes called intermodulation noise, that interfere with channel performance as the system operation approaches transponder saturation, the signal powers must be additionally decreased (backed-off) to maintain system operation in a linear region. In a system containing ten carriers, the signal power of each of the carriers may have to be reduced an additional 8–10 dB. This power reduction reduces the intermodulation noise, but compromises system performance.

This invention has the advantage of permitting higher operating levels and therefore an increased system performance. The benefits of increased system performance can be obtained from a variety of schemes:

1. The signal power levels can be operated at a higher level than otherwise permitted, and result in an increased signal-to-noise level or higher quality signal.
2. The signal power levels can be backed-off to a level impermissible in a system that does not use the invention, and the system performance margins can be increased to a higher level than otherwise permitted.
3. The signal power levels can be backed-off and, if the transponder bandwidth permits more channels, the number of channels can be increased to a greater amount than otherwise permitted.
4. The signal power levels can be backed-off and, if the transponder bandwidth permits, the information rate of each channel can be increased to a greater amount than otherwise permitted.
5. By having the signals operating at higher levels, the transponder efficiency, defined as RF power/DC power, is increased.
6. Since the transponder efficiency is increased, a smaller, less powerful and less expensive satellite can be used.

This invention can result in increased operating revenue from a satellite communications system or in decreased operating costs. Increased revenue occurs by enabling more signals or higher information rates/signal. Decreased operating costs occurs if more signals can be allowed through one satellite transponder, therefore reducing the per signal lease cost.

This invention is useful in multi-carrier systems, especially in synchronous communications systems that lock the carriers and baseband signal clocks to a reference frequency. For this invention, carrier lock is required in those systems, such as satellite communication systems, in which there may be a Doppler shift in carrier frequencies. For this invention, any change in carrier frequencies should be exactly proportional to the carrier frequency ratios. In some non-linear systems, the appearance of intermodulation noise has been reduced by locking the frequency and phase of all of the carriers of the multi-carrier system so that the carriers are all equally spaced or harmonically related to each other (see FIG. 1). This type of system is defined as a Frequency Division Multiple Access (FDMA) system with harmonically related carriers. By this method the intermodulation products of the carrier frequencies of the modulated signals fall on each of the carriers and not into the signal bands. Nevertheless, the modulation components from each of the modulated carriers cross into other signal bands, interfering with these signals and degrading their performance. In preferred embodiments of FDMA systems, this invention cancels the modulation signals that cross into other channels, preventing the degradation of signal performance.

Another application of the present invention is in Code Division Multiplexing Access (CDMA) systems that radiate from one point to many points. CDMA has become a widely proposed communications system for mobile communications in which multipath and signal interferences are problems. In a CDMA system, the carriers transmit at the same frequency. Each of the CDMA communications is differentiated by a spreading code unique to each communication. The CDMA system can therefore also be characterized as a spread spectrum system. The spreading code results in a spread spectrum signal that occupies a frequency band that multiplies the data band by the ratio between the spreading signal rate and the baseband data rate. A correlator in the receiver is used to remove the spreading code of the desired signal and retrieve the data signal in the despread band. The other signals, those that have another spreading code, remain spread so that they are predominantly wide-band and, after the narrow-band data filtering, most of their energy is rejected so they do not interfere with the desired signal (see FIG. 2).

In a CDMA system in which the carriers radiate from a central system, the carriers can be conveniently locked so that all of them are exactly at the same frequency and phase. The frequency lock of CDMA carriers results in third order intermodulation products (2A–B terms) of the carriers falling exactly on the same carriers, similar to the FDMA system shown in FIG. 1. Because single frequency in-band interferences are spread over a much wider bandwidth, most of their energy is rejected by the narrow band data filter and are not a problem in spread spectrum systems. Nevertheless, in a non-linear system, there is signal compression and distortion of the spread spectrum signals. Reportedly, performance of spread spectrum signals can be severely degraded in a non-linear CDMA system. See, for example, "Interference Effects of Hard Limiting in PN Spread-Spectrum Systems" by Hans P. Baer, *IEEE Transactions on Communications* (May 1982).

Other proposals for reducing intermodulation noise generated in a multi-carrier system that contains non-linear active components and the limitations of these proposals are as follows:

1. Spacing the carriers so that intermodulation noise products fall in unused spectrum space rather than in any of the signal channels. This procedure is rarely practical since it requires an inordinate amount of bandwidth to achieve the proper carrier spacing and wastes the unused bandwidth.

3

2. Introducing a pre-distortion device in the RF path, after modulation, that has a transfer function, which together with the transfer function of the non-linear active component, creates a linear system. The implementation of this type of system is not easily realized. It is difficult to obtain exacting complementary response curves and the pre-distortion device must track the non-linear transfer function. See, for example, "An Automatically Controlled Predistorter for Multilevel Quadrature Amplitude Modulation", Junji Namiki, *IEEE Transactions on Communications* (May 1983).

3. Backing off input power so that the output level and distortion are reduced. This is the usual approach. As described previously, its limitation is that it results in a reduction of signal-to-random noise ratio.

4. Use of distortion cancelling circuitry such as "push-pull" amplifiers. This technique cancels even order distortions, but not third order distortions.

5. Use of feed-forward techniques in which the input signal is tapped off and then subtracted from the output signal. After the subtraction only the distortion remains. This distortion is subtracted from the output signal, lowering the intermodulation products in the output signal. This technique is not practical for satellite transponders because its circuitry is copious, power demanding and needs periodic adjustments.

SUMMARY OF THE INVENTION

This invention provides practical methods and apparatus for cancelling inter-modulation noise in an FDMA system, or for compensating for signal compression in a CDMA system, that is introduced by a non-linear repeater such as a satellite transponder, and that degrades system performance in carrier-locked FDMA and carrier-locked CDMA systems. This inter-modulation noise cancellation and compression compensation are accomplished with minimal reduction in input signal power to the transponder beyond the reduction required to prevent transponder over-saturation. In preferred embodiments, this power reduction is less than about 2 dB.

BRIEF DESCRIPTION OF THE DRAWINGS

The invention can be better understood from the following description in conjunction with the accompanying block diagram drawings. The FDMA systems described in some of the drawings use harmonically related carriers and digital modulation. The CDMA systems described in other drawings use synchronized carriers at the same frequency, orthogonal spreading codes, and digital modulation.

BRIEF DESCRIPTION OF THE DRAWINGS

Figure 1:
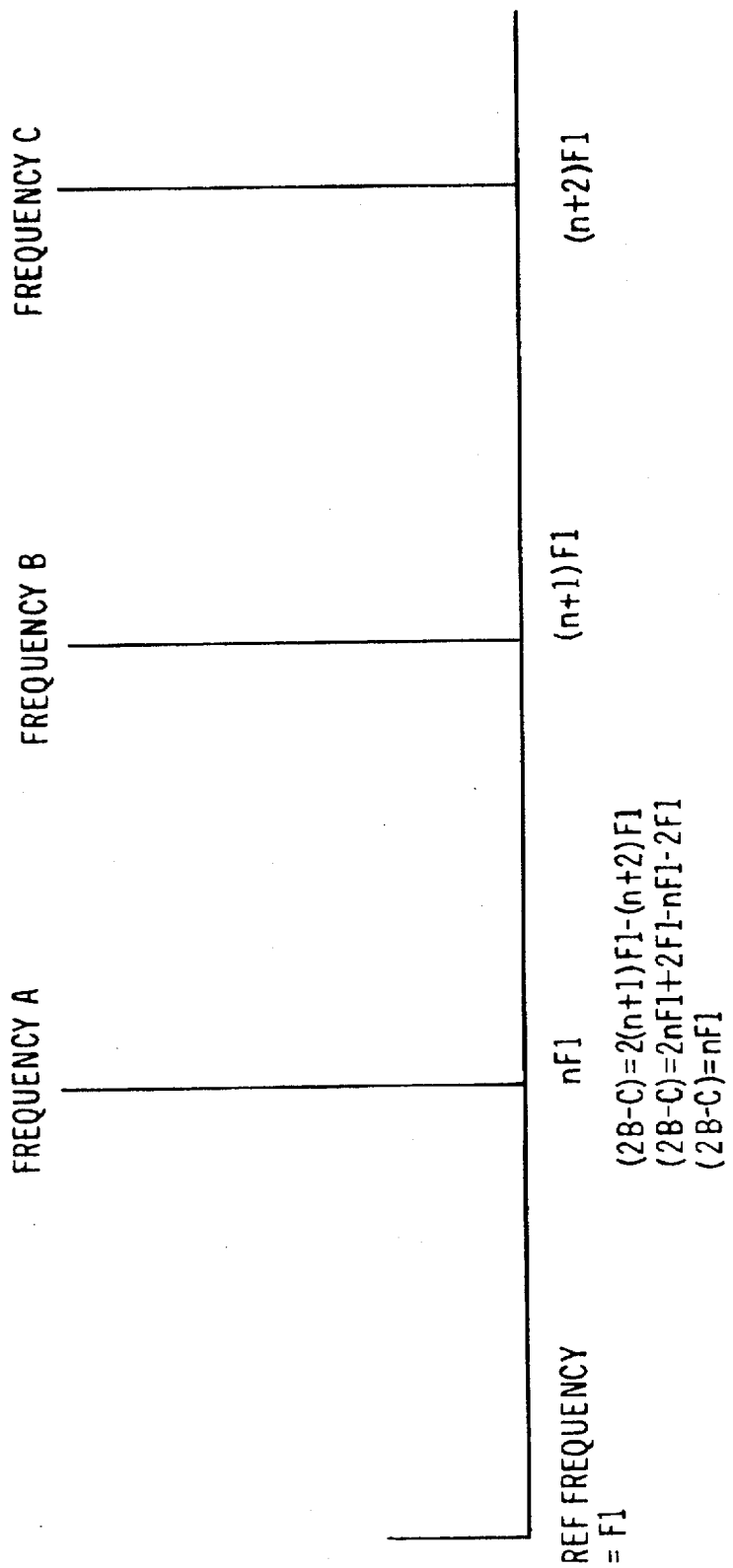
Figure 2:
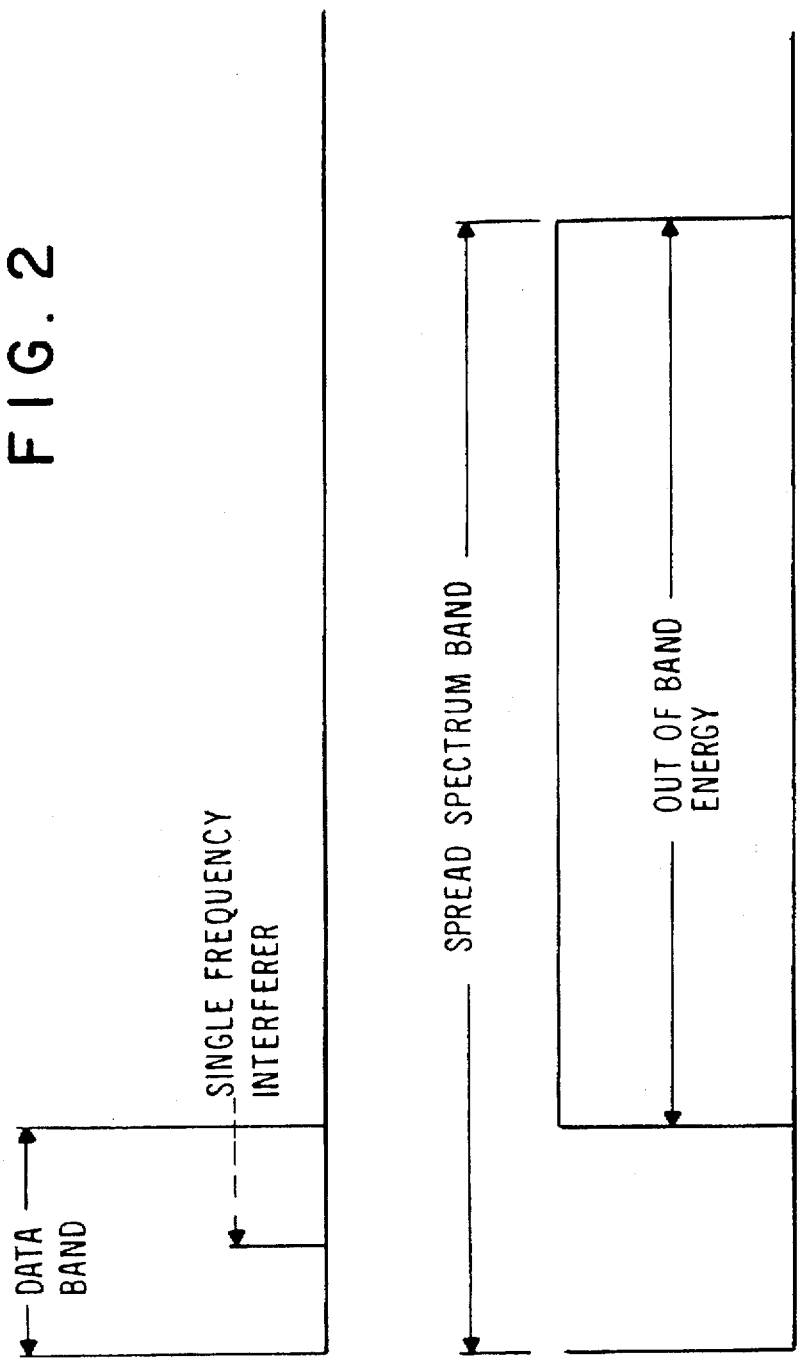
Figure 3:
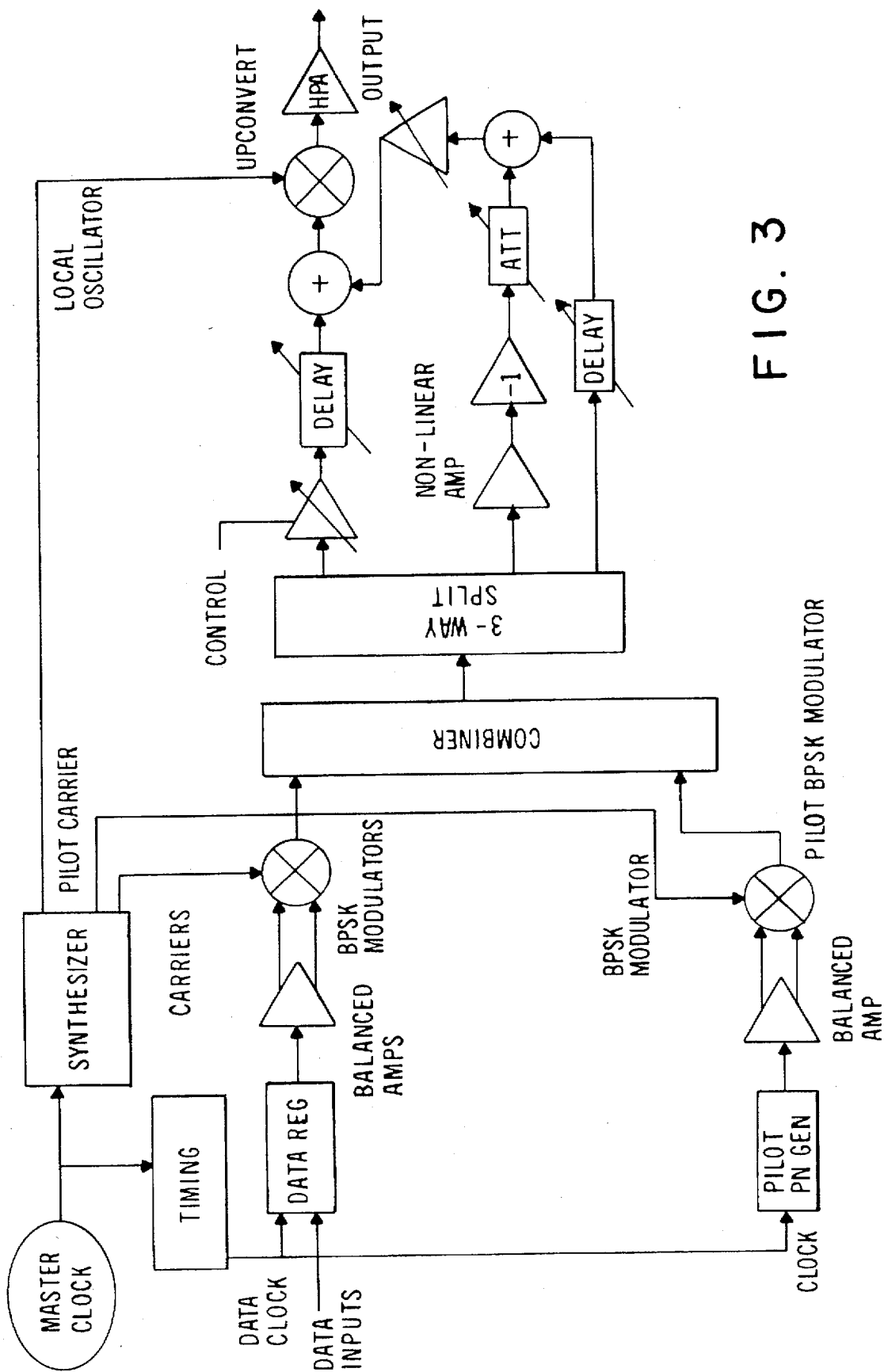
Figure 4:
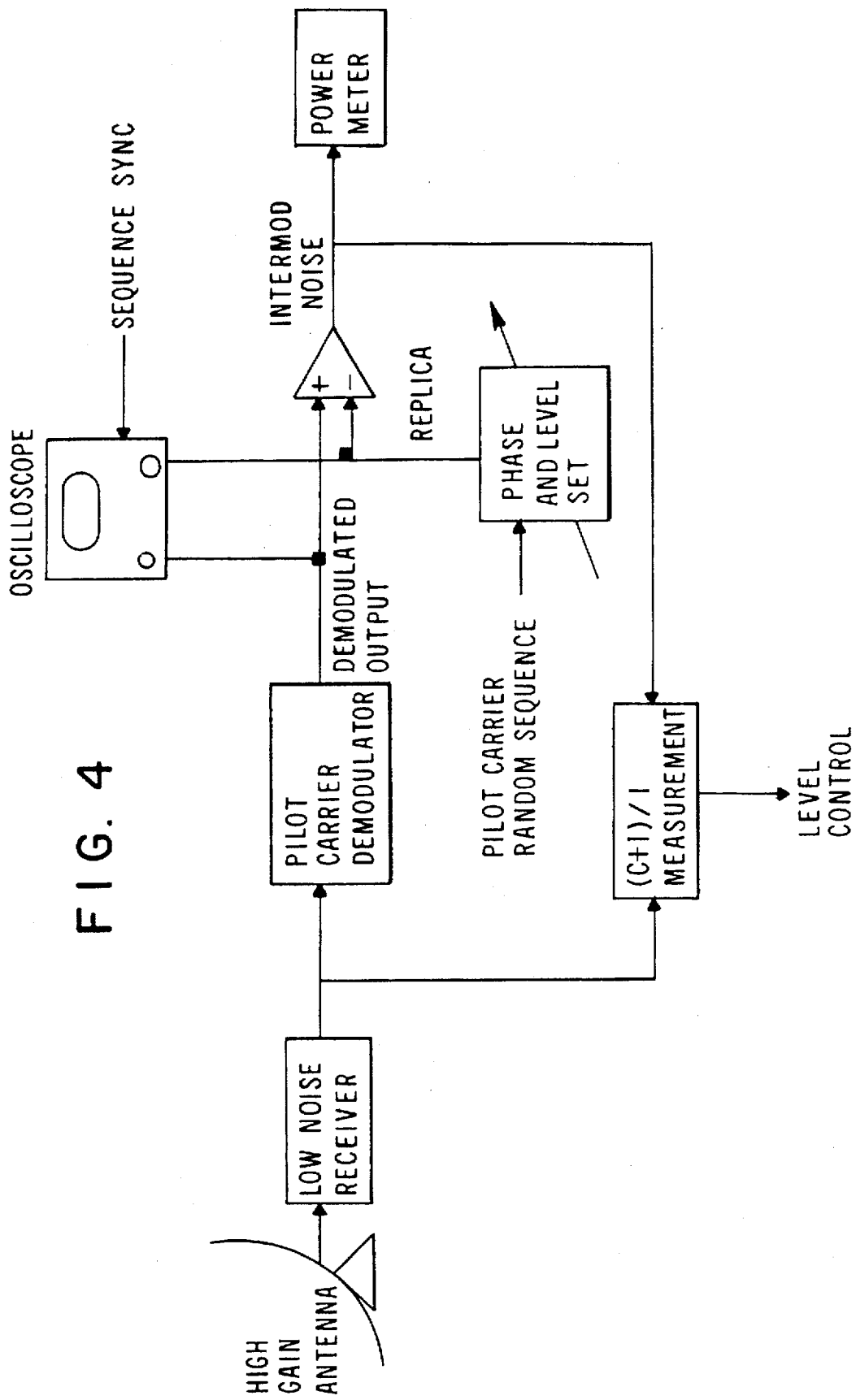
Figure 5:
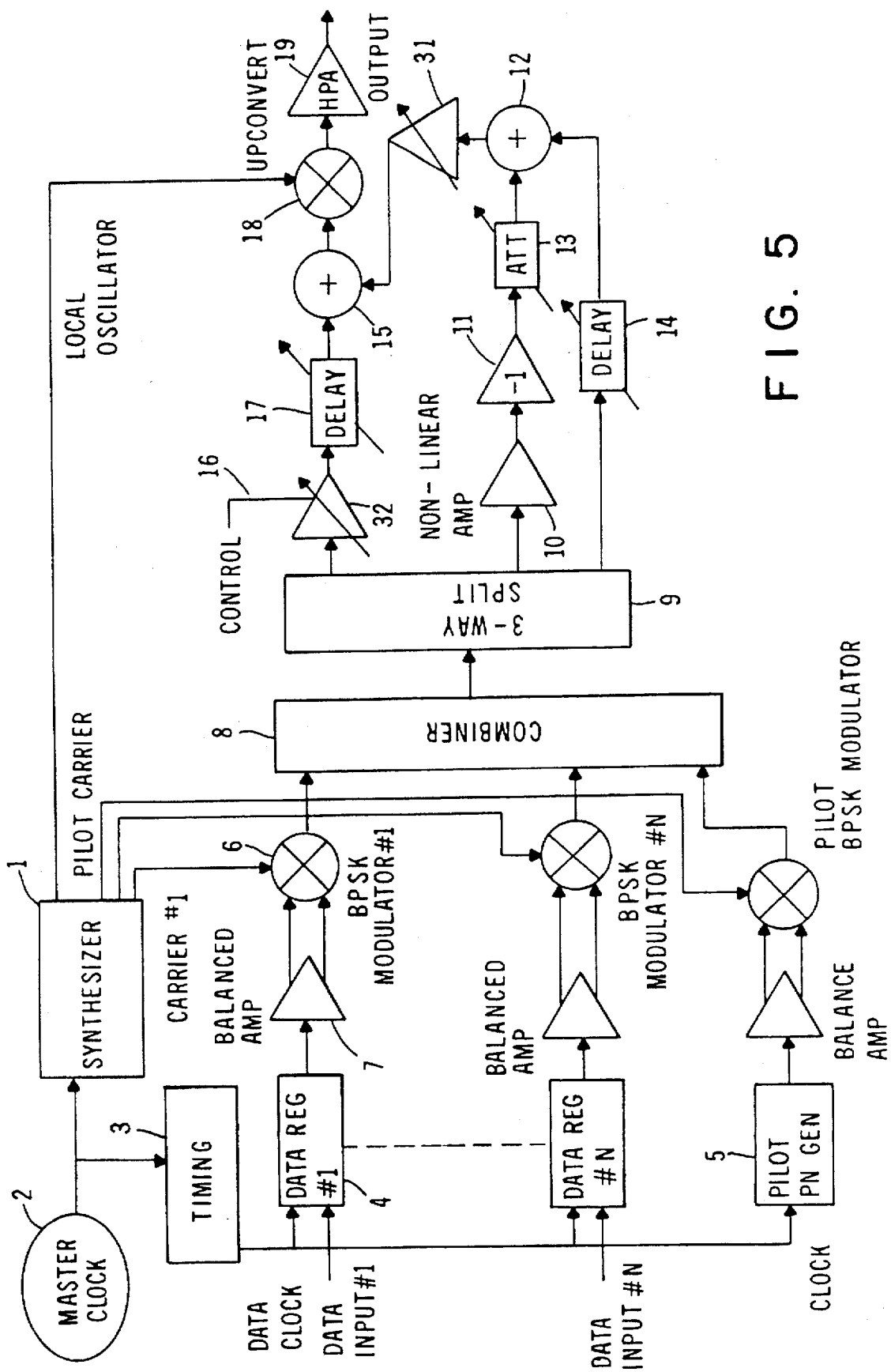
Figure 6:
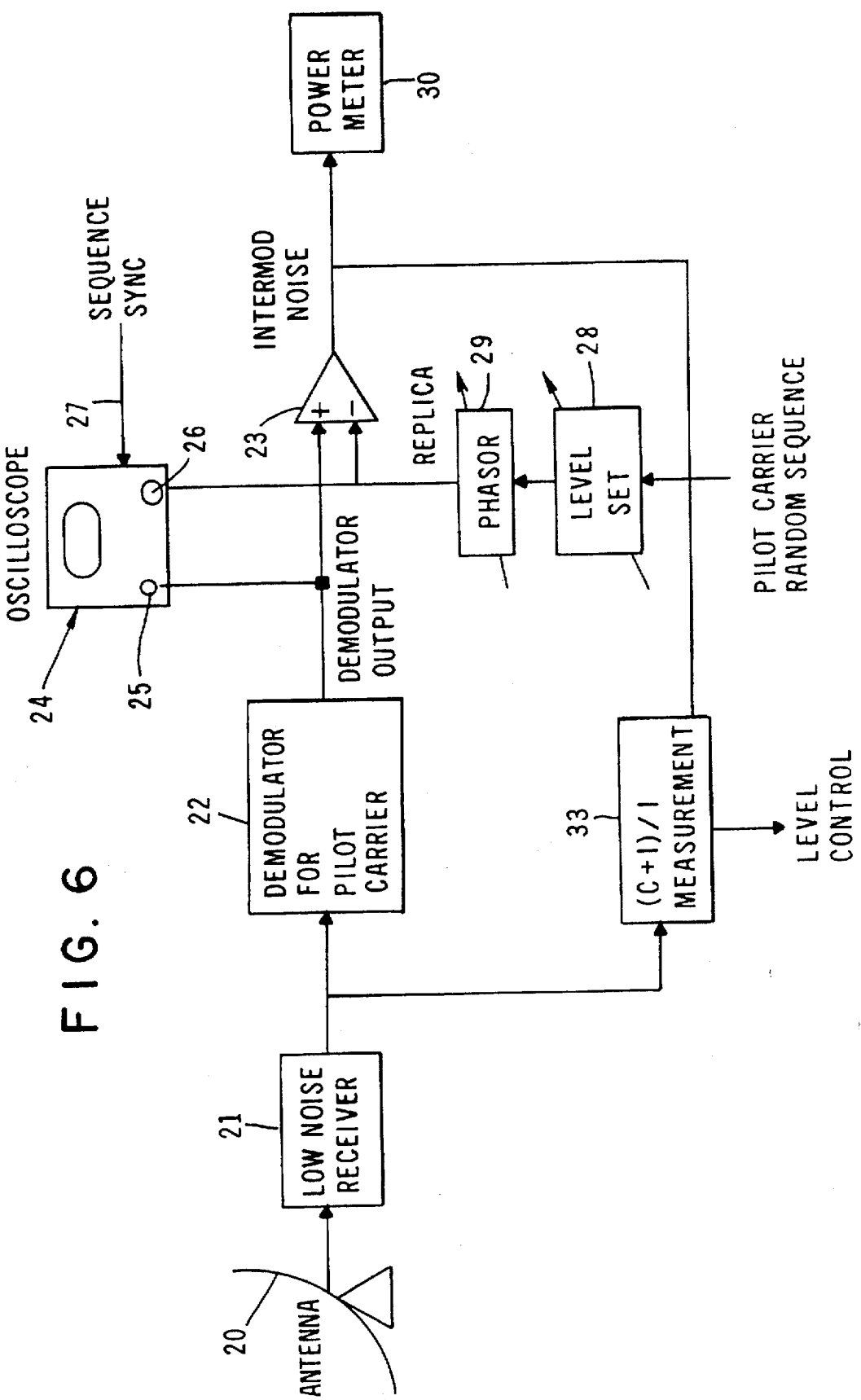
Figure 7:
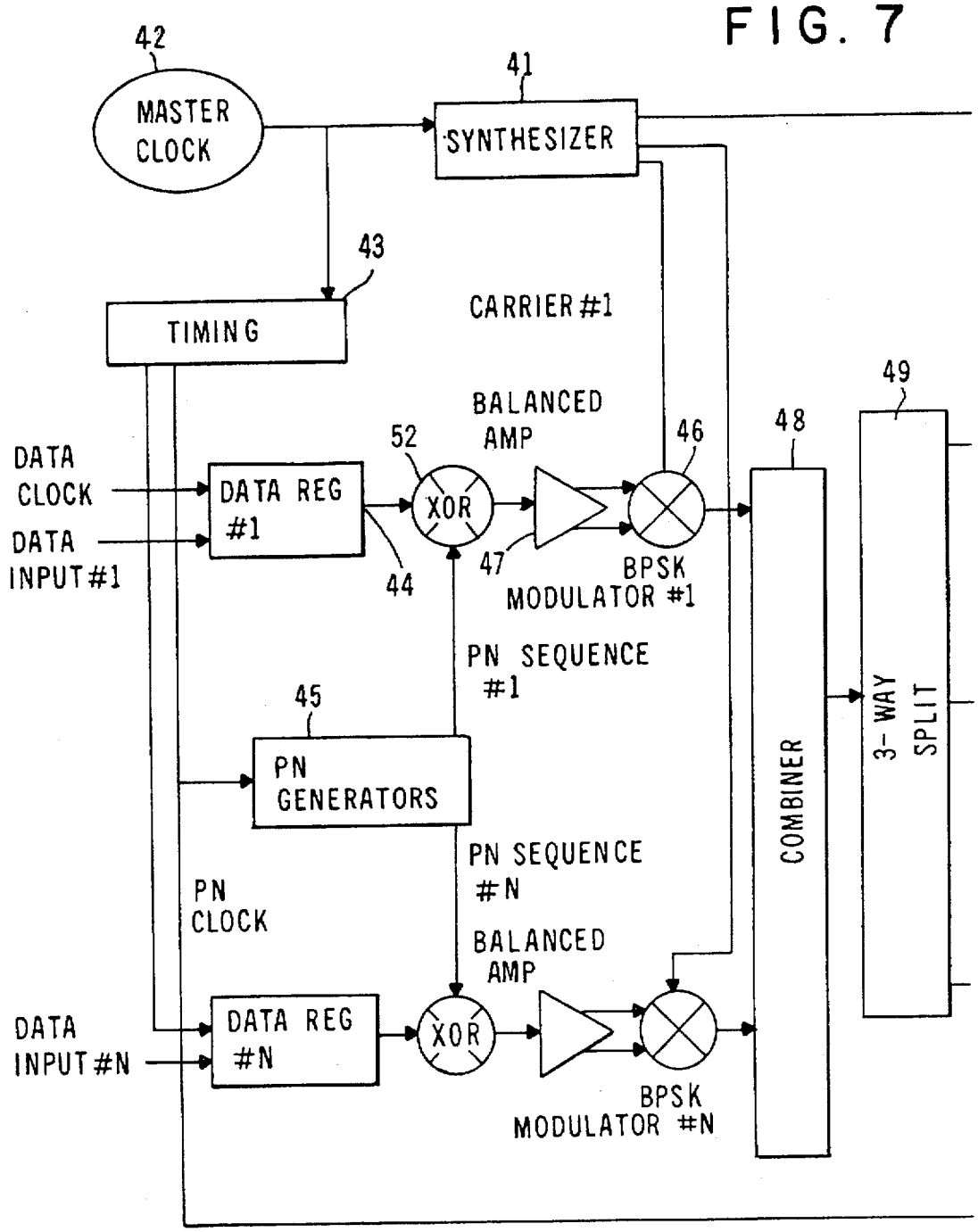
Figure 7A:
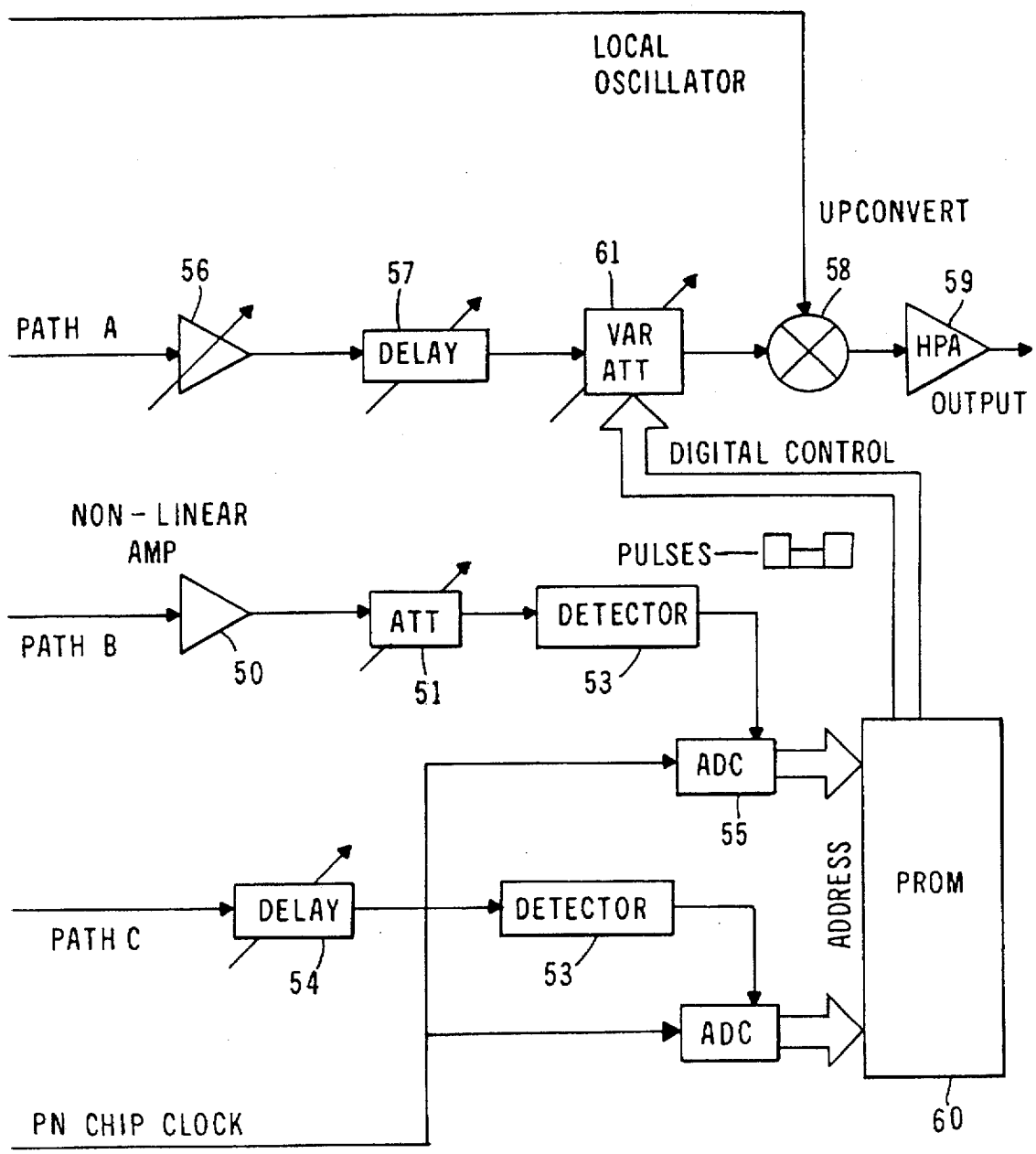
Figure 8:
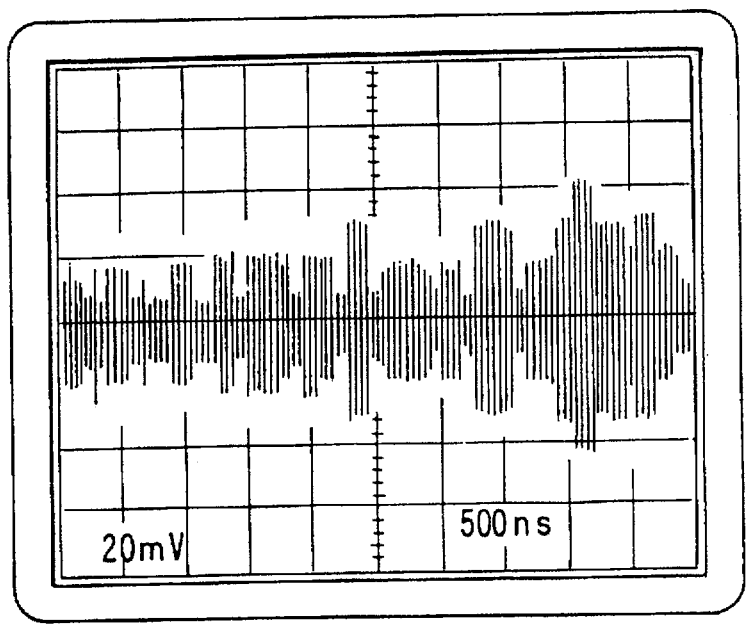
Figure 9:
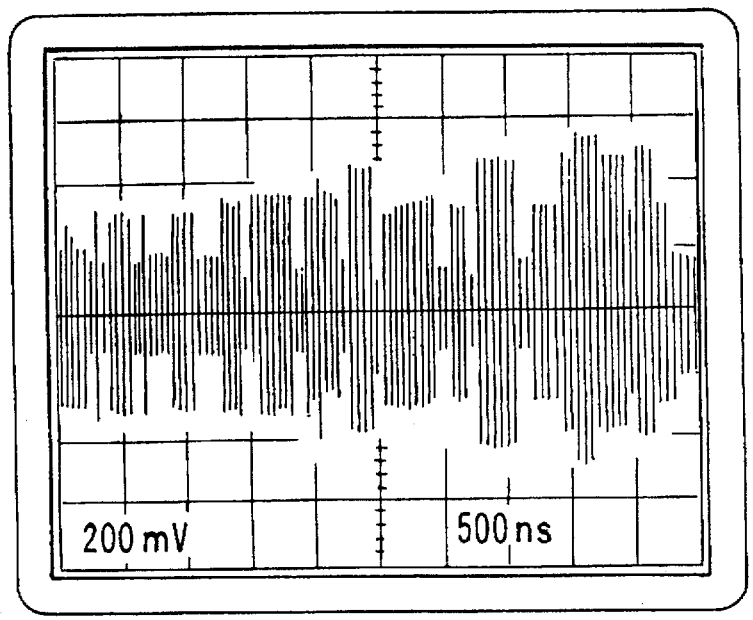
Figure 10:
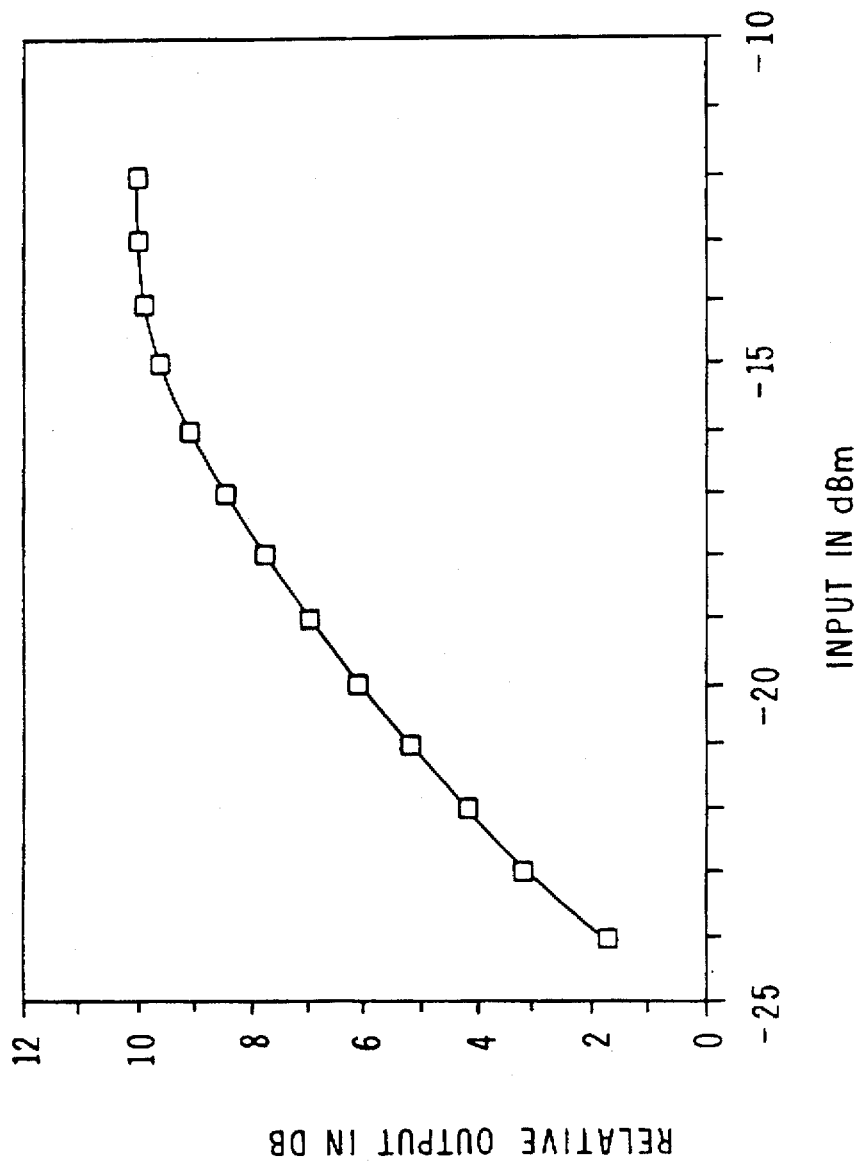
Figure 11:
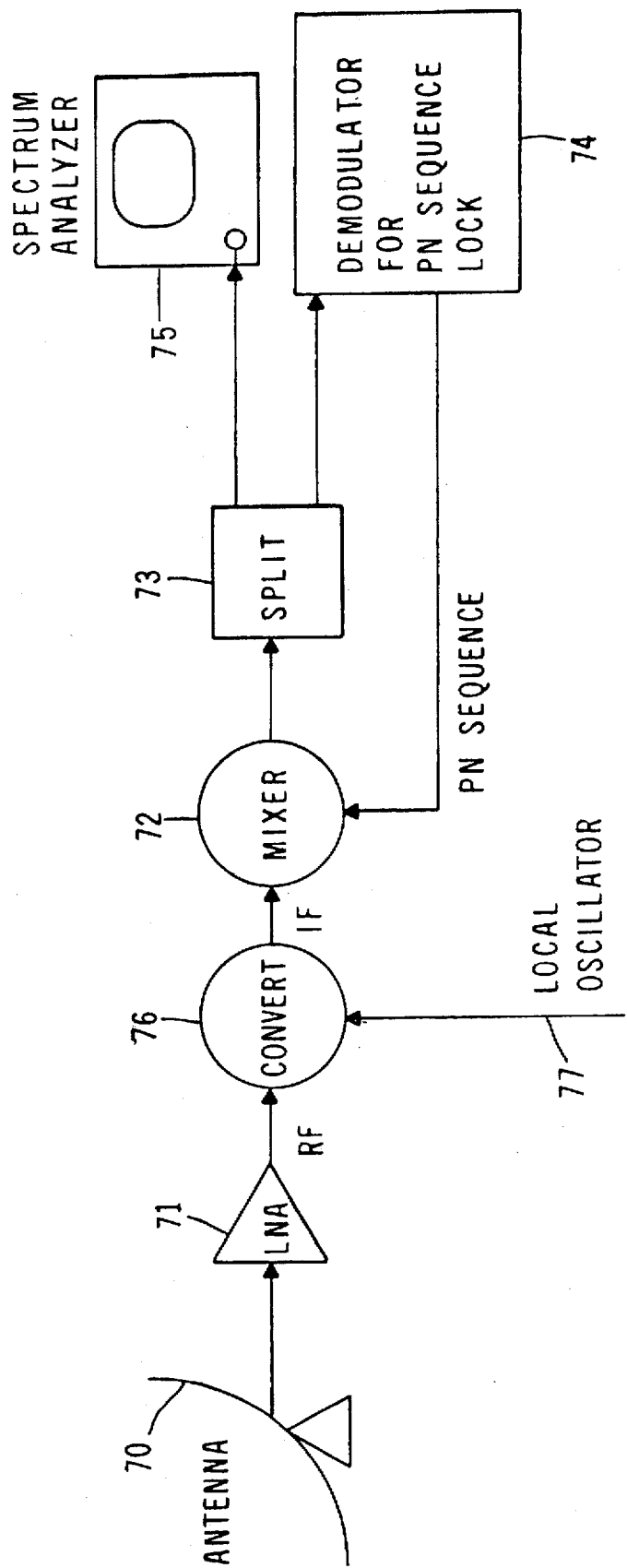

This invention can be better understood by reference to the drawings, in which:

FIG. 1 illustrates a multicarrier system in which the carriers are all equally spaced or harmonically-related to each other;

FIG. 2 shows, in schematic form, a CDMA spread spectrum system showing certain filtering effects;

FIG. 3 shows, in schematic form, a transmitter for an exemplary FDMA system of this invention;

FIG. 4 shows, in schematic form, an exemplary receiver system of this invention for demodulating a reference pilot carrier;

FIG. 5 shows, in schematic form, an exemplary FDMA transmitting system that provides the means and the compensating signal for adaptive cancellation of inter-modulation noise;

FIG. 6 shows, in schematic form, an exemplary receiver system for achieving distortion cancellation;

FIGS. 7 and 7A show, in schematic form, an exemplary transmitter of a CDMA system That compensates for signal compression;

FIG. 8 shows an example of the result of combining an even number of synchronous, phase-modulated signals;

FIG. 9 shows an example of the result of compression of the combined signals shown in FIG, 8;

FIG. 10 shows a non-linear gain curve that provides information to a programmable memory, such as in FIG. 7;

FIG. 11 shows, in schematic form, a system for receiving, demodulating and de-spreading CDMA signals to produce a BPSK waveform; and FIG, 12 shows an example of a BPSK waveform spectrum that the system of FIG. 11 can produce.

BRIEF DESCRIPTION OF THE PREFERRED EMBODIMENTS OF THE INVENTION

The invention transmitter of the FDMA system, shown in FIG. 3, has a duplicate of the satellite transponder distortion circuitry. Either a copy of the non-linear device, or a simpler circuit, whose design closely tracks the transfer function of the satellite transponder amplifier, can be used to generate the distortion. Preferably, all of the combined, modulated signals that are introduced to the duplicated distortion circuitry before transmission contain inter-modulation noise products that are opposite in phase to the satellite inter-modulation noise, but are substantially the same in all other respects.

The transmitter is housed in a central station. The central station contains the electronic equipment that processes the digital signals, modulates the carriers, and combines, amplifies and transmits them to the satellite. The central station also contains monitoring receiver equipment that receive the signals from the satellite, and amplify, convert, demodulate and monitor signal quality. One feature of the central station electronics is that all active equipments in the signal path are linear so that the central station does Rot distort any of the signals.

After the signals are amplified by the non-linear amplifier that simulates the satellite repeater non-linearity, they are inverted and the non-distorted signals are compared With the inverted distorted signals. The non-distorted modulated carriers are set to be approximately equal in level and opposite in phase to the inverted distorted modulated carriers.

One method for accomplishing the level and phase settings is by observing the comparator output on a spectrum analyzer. First, the levels of the two signal paths are set to be equal. The distorted signals are removed and their input at the comparator is terminated. This leaves only the undistorted signals at the comparator output. Their levels are measured on a spectrum analyzer. Then the undistorted signals are removed, and their input at the comparator is terminated, leaving only the distorted signals at the comparator output. The distorted signal levels are set by an attenuator to be equal in level to the previous measurement of the undistorted signals. After the level setting, the non-distorted signals are delayed by an adjustable all-pass filter, whose attenuation stays constant as its delay is altered. The all-pass filter, whose delay is constant over the frequency band of interest, can use a coaxial cable as the delay element. As the non-distorted signals are adjusted to be opposite in phase to the distorted signals, the signal levels at the comparator output are gradually reduced. The attenuator and delay controls are trimmed until the signal levels are minimized. For more precise adjustment of the phase delay, an adjustable coaxial air line can be used after the coarse adjustment with the coaxial delay line. After the comparison, the non-distorted modulated carriers are subtracted from the distorted signals, and only the intermodulation noise products remain.

Another method for accomplishing the level and phase settings is to use a single modulated carrier and observe the comparator output on an oscilloscope. When the levels of the comparator inputs are equal and opposite in phase, the sinusoidal modulation waveform will be minimized in level. This method is simpler, but less precise than the spectrum analyzer method. It may not address additional phase shifts to the signal that occur in the presence of the other signals and when all of the signals are driven into saturation.

The in-band inter-modulation noise products are inverted in phase, and a controlled amount is added to the non-distorted signals in another combining path. In this path, the non-distorted signals are delayed by the same amount as the total delay encountered in the circuitry and path that generated the inter-modulation noise and added the noise to the non-distorted signals. The inter-modulation noise is introduced to all of the channels at the ground station at a level sufficient to cancel the inter-modulation noise of a satellite transponder that is operated in a non-linear region.

There are several methods for adjusting the level required for the introduced intermodulation noise. A first method is performed by observing the pilot signal in the downlink. A second method observes a vacant channel slot of the multiplexed signal band.

In the first method, the pilot signal is modulated with a known periodic random sequence, then combined with the other modulated signals at the central station. Preferably, the observed signal is the demodulated downlink signal after the pilot carrier has been processed by the satellite transponder and been subjected to the transponder's non-linear actions. A central station receiver, shown in FIG. 4, is used to demodulate the pilot carrier received on the downlink. The demodulated signal contains the intermodulation noise introduced in the transponder on the pilot carrier due to the transponder non-linear action.

Preferably, the receiver random noise power is substantially below the inter-modulation noise power. To this end, the central station receiving system has a large ratio between its antenna gain and its receiver noise (G/T). The principal contribution to the noise is then the satellite transponder random and inter-modulation noise rather than the central station receiver noise. Since, in satellite communications systems, the transponder C/N is usually 25–30 dB, the system preferably maintains the carrier-to-inter-modulation noise ratio (C/I), sometimes called the carrier-to-interference ratio (C/I), at greater than 25 dB.

First, the transmitting system is operated without the introduction of the inter-modulation noise generated at the central station. The received pilot signal of the downlink is demodulated, and the demodulated data is observed on an oscilloscope. The random sequence, although contaminated by the inter-modulation noise, will be readily observable. A pulse at the start of the transmitter's pilot carrier random data sequence synchronizes the oscilloscope. The transmitted pilot signal data, which is the known periodic random sequence, is observed on another channel of the oscilloscope. This signal is delayed so that it is phase-coincident with the signal on the other oscilloscope trace. The signal is also filtered and adjusted in its amplitude so that it appears as a replica of the demodulated downlink signal of the pilot carrier. The replica signal, since it is already available at the central station, can be delayed, shaped and made phase-coincident with the demodulated random sequence by many means. One means for delaying the replica signal and making it phase coincident with the demodulated signal is by using lengths of coaxial cable to bring the phase of the two signals close to one another and then using stretchable coaxial air lines to finely adjust the phases. A low pass filter design can then be used to match the rise and fall times of the two signal waveforms. Another means is to use an all-pass filter design that delays the replica signal, shapes its waveform, and does not distort it.

The replica data is compared with the demodulated data. The result of this comparison is subtraction of the data, leaving as the demodulated signal only the inter-modulation noise that was generated from the non-linear distortions in the satellite transponder. The inter-modulation noise is observed on a sensitive power meter.

In the second method for adjusting the level required for the introduced inter-modulation noise, the inter-modulation noise created by the FDMA carriers is observed in a vacant slot in the band. A spectrum analyzer that is tuned to the vacant channel frequency clearly displays the inter-modulation noise.

After either of the above operations, the inter-modulation noise generated at the central station is combined with the other signals before their transmission to the satellite. The central station inter-modulation noise level is carefully adjusted, and the downlink received distortion power is observed. The inter-modulation noise generated at the central station transmission is slowly increased in power until the measured inter-modulation noise from the downlink signal reaches a minimum. At this setting, the inter-modulation noise generated at the central station and combined with the signals, in the transponder amplifier, is approximately equal and opposite in phase to the intermodulation noise generated in the satellite transponder.

As a fine tuning, the combined signal level at the central station before the central station linear amplifier is slowly adjusted in level to reduce further the downlink demodulated inter-modulation noise. This procedure tends to place the signals at an operating point in the satellite transponder amplifier non-linear gain curve that is similar to the operating point of the central station non-linear amplifier gain curve so that the generated distortions of the central station non-linear amplifier and the satellite transponder are the same. The central station-inter-modulation noise level is finely adjusted to reduce further the downlink demodulated inter-modulation noise. Fine adjustment of both the central station inter-modulation noise level and the central station combined signal level continues until the downlink demodulated inter-modulation noise is minimized.

DETAILED DESCRIPTION OF THE PREFERRED EMBODIMENTS OF THE INVENTION FDMA SYSTEM

A preferred embodiment of the invention for an FDMA system provides adaptive cancellation of the inter-modulation noise that occurs on FDMA signals. Although adaptive cancellation is feasible for a CDMA system, preferred CDMA embodiments provide compensation for signal compression and reduce the loss in correlation gain resulting from compression of the CDMA signals.

FIG. 5 depicts a FDMA transmitting system including many carriers. Each of these carriers is harmonically locked by synthesizer 1 to a multiple of master clock 2. The data clock is also derived from master clock 2 in timing circuit 3. Data for each channel is buffered in data register 4. A pseudo-noise (PN, i.e. a periodic random sequence) generator 5, unique to the pilot carrier channel, provides data for the pilot carrier channel. The data is modulated in binary phase shift keying (BPSK) balanced modulator 6. The data is routed to BPSK 6 by balanced amplifier 7 that converts the unbalanced signal to a balanced mode. The BPSK modulation places all power in the sidebands and theoretically suppresses the carrier. The data clocks, PN clock and carriers of all of the signals are synchronized so that the system functions as a synchronous, multi-carrier FDMA system. The modulated signals are combined in passive combiner 8, then split into three paths by three-way splitter 9.

Before transmission, the combined signals are processed by a non-linear amplifier 10 that has the same non-linear characteristic as the satellite transponder. The distorted signals, consisting of the combined signals and the inter-modulation noise, are inverted in inverter 11, then compared with the non-distorted signals in comparator 12. A distorted signal has its level set by a variable attenuator 13 so that the distorted signal level is equal to the non-distorted level at the comparator 12 inputs. A non-distorted signal has its delay set by a variable delay circuit 14 so that at the comparator inputs the phases of the non-distorted signal and the distorted signals are exactly opposite in phase to each other. As a result, the modulated carrier signals will cancel, and the output of the comparator is only the inter-modulation noise and higher harmonics of the signals. The inter-modulation noise, which had been inverted in phase in inverter 11, is then added to the combined signals in summer 15. The higher harmonics are filtered by a low-pass filter that is matched in the other paths, so as to maintain the signal delays equal in all paths. The low-pass filters are not shown on the diagram of FIG. 5.

The combined signals to the summer have their combined power controlled manually or automatically from a remote circuit. The phase is manually controlled. The level control is labelled 16. The phase control is labelled 17. The output of the summer 15 is then converted to the transmission band by a mixer 18. The converted signals are amplified by a linear high powered amplifier (HPA) 19, and routed to the antenna for transmission to the satellite.

The satellite transponder converts, amplifies and retransmits the combined signals to mobile or fixed platforms. During this process, the non-linear active components in the satellite transponder introduce inter-modulation products to each of the channels and to the pilot signal.

FIG. 6 describes the central station receiver and the method by which the invention achieves distortion cancellation.

A low noise receiver 21 at the central station, that has an antenna 20 with a high antenna gain and a receiver with a low noise amplifier receives the signal. Since the gain-to-thermal noise (G/T) is high, the signal-to-noise ratio is substantially influenced by the inter-modulation noise resulting from the satellite transponder non-linear distortions rather than by the random noise component. The receiver has a demodulator 22 that demodulates the pilot carrier signal. The demodulated output contains the pilot carrier baseband signal, which is a random sequence, and the inter-modulation noise, which is reduced to baseband. The pilot carrier baseband signal is then cancelled in a differential amplifier cancellation circuit 23, leaving only the baseband inter-modulation noise. The cancellation scheme is performed as follows:

(1) First, the transmitting system is operated without the introduction of the inter-modulation noise generated at the central station.

(2) An oscilloscope 24 displays the demodulated baseband signal 25 on one oscilloscope trace and the pilot signal random sequence 26 of the transmitter on the other oscilloscope trace. The oscilloscope is synchronized by a synchronizing signal 27 from the transmitter that indicates the start of the random sequence of the pilot carrier signal.

(3) The oscilloscope monitors the amplitude and phase differences between the two trace signals. The pilot carrier transmit baseband signal is manually adjusted in amplitude by an attenuator 28 and adjusted in phase by phaser 29 until the two signal traces are equal in amplitude and phase. After the adjustments, the pilot carrier transmit baseband signal is a close replica to the received demodulated signal.

(4) The demodulated and replica signals are compared in the differential amplifier 23. The result of this differential comparison is the subtraction of the demodulated baseband signal by the replica signal, leaving only the baseband inter-modulation noise at the demodulator output. The inter-modulation noise is observed on a sensitive power meter 30.

After these operations, the inter-modulation noise, generated at the central station in non-linear amplifier 10 (FIG. 5), is combined with the other signals before their transmission to the satellite. The inter-modulation noise level is carefully adjusted in variable gain amplifier 31 (FIG. 5) and the downlink received baseband distortion power is observed on sensitive power meter 30.

The inter-modulation noise generated at the central station transmitter is slowly increased in power until the observed inter-modulation noise from the downlink signal is reduced to a minimum. At this setting, the inter-modulation noise generated at the central station, and combined with the modulated signals, is, in the transponder amplifier, approximately equal in amplitude and opposite in phase to the inter-modulation noise generated in the satellite transponder. As a fine tuning, the combined signal level at the central station is manually adjusted in level in variable gain amplifier 32 (FIG. 5) to minimize further the observed downlink demodulated inter-modulation noise.

This procedure tends to locate the satellite transponder amplifier operating point on the non-linear portion of the gain curve at a similar operating point to that of the central station non-linear amplifier. As a result, the central station and the satellite transponder generate inter-modulation noise products that are equal in the transponder. The central station inter-modulation noise level is again finely adjusted to minimize further the downlink demodulated inter-modulation noise. Fine adjustment of both the central station inter-modulation noise level and the central station combined signal level continues until the downlink demodulated inter-modulation noise is substantially minimized.

This invention, in preferred embodiments, maintains inter-modulation noise cancellation in a changing environment. Once the central station inter-modulation noise level and the central station combined signal level are set at specific values, the inter-modulation distortion can vary with subtle changes in the communications medium. If the propagation medium attenuation increases, then the level to the transponder is reduced and the transponder distortion is reduced. The compensating distortion introduced at the transmitting station is then too high, the cancellation is incomplete, and a residual distortion remains. Alternatively, if the transponder gain increases, then the repeater distortion also increases, and the introduced compensating distortion is insufficient to cancel the transponder inter-modulation noise. Again there is residual distortion.

There are two cases:

Case 1: The input level to the satellite transponder increases and thus the satellite transponder generated inter-modulation noise increases at a slightly faster rate than the inter-modulation noise introduced at the central station. In this case, the downlink carrier level increases and the downlink inter-modulation noise increases at a slightly higher rate. The downlink (C+I)/I decreases.

Case 2: The input level to the satellite transponder decreases and thus the satellite transponder generated inter-modulation noise decreases at a slightly faster rate than the inter-modulation noise introduced at the central station. In this case the downlink level also decreases. Nevertheless, since the intermodulation noise generated at the central station is too high in value to cancel the decreased satellite inter-modulation noise, the downlink inter-modulation noise increases. The downlink (C+I)/I therefore decreases.

The pilot carrier and the inter-modulation noise also change when the downlink attenuation either decreases or increases. However in these cases the (C+I)/I will remain constant. By observing the constant ratio of the (C+I)/I, despite the pilot carrier level change, the circuitry that controls the central station combined signals level determines that the cancellation is complete, and that there is no need to vary the level.

After the initial setting of the level controls, the variable attenuator 32 that controls the level of the central station combined modulated signals is selected to be controlled automatically rather than manually. The control signal is derived from a circuit 33 that measures the relative levels of the received downlink demodulated pilot carrier level and the inter-modulation noise in its band. This is essentially the pilot's carrier plus inter-modulation noise-to-inter-modulation noise ratio (C+I)/I.

If the measuring circuit 33 determines that Case 1 exists, then the circuitry decreases the combined signals level. This decreases the transmit level and readjusts the satellite transponder operating point so that its inter-modulation noise is decreased, and is again equal to that received from the central station.

If the measuring circuit determines that Case 2 exists, then the circuitry increases the combined signals level. This increases the transmit level, and readjusts the satellite transponder operating point so that its inter-modulation noise is increased and is again equal to that generated at the central station.

CDMA SYSTEM

For CDMA systems, the invention compensates for the signal compressions occurring in a saturated system rather than cancelling the inter-modulation distortions resulting from the non-linear action. FIG. 7 is a block diagram of such a CDMA system.

The master clock 42, synthesizer 41 and timing 43 perform the same functions as in the FDMA system. The timing 43 has an additional clock, the PN clock. The outputs 44 of each of the data registers are spread by orthogonal pseudo-noise sequences in mixer circuits (XOR) 52. The orthogonal sequences are generated by pseudo-noise generators 45. The spread spectrum signals are converted from unbalanced inputs to balanced outputs in balanced amplifier 47. The spread data are modulated in BPSK modulators 46 and combined in combiner 48. The combined outputs are then split into three paths by three-way splitter 49.

Paths A and C contain the combined signals and do not compress or distort the signals. In all paths, the synchronization of the CDMA carriers and their spread data, create enhancements and lessenings (or additions and subtractions) to the spread spectrum signal power at each PN interval. The amount of subtraction or addition depends upon the carrier phases of the signals at each PN bit, also called a PN chip. The BPSK modulator, shown in FIG. 7, determines the carrier phases of each of the PN chips of each of the signals. There are only two phases: 0 degrees or 180 degrees. Those signals that are in phase (0 degrees) will add to each other. Those signals that are out of phase (180 degrees) will cancel each other. As one example, the result of the combining action of an even number of signals can appear as shown in FIG. 8. At times, the combined signals almost entirely cancel one another. At other times, the signals are almost entirely summed. Although this embodiment uses a BPSK system, a similar description that considers four phases (+45, +135, −45, −135 degrees) applies to a quadrature phase shift keying (QPSK) system.

Path B has a non-linear amplifier that duplicates the non-linear amplifier of the satellite transponder. Due to the compression action of the non-linear amplifier that operates close to saturation for the peak signal, the combined signals are unevenly compressed in accord with their relative levels. The result of the compression in the nearly saturated amplifier of the combined signals depicted in FIG. 8 is shown in FIG. 9. In the intervals in which the combined signals are close to cancellation, they remain almost at a null after the non-linear amplification. The other intervals, in which the signals are not cancelled, are amplified closer to saturation, with subtle, but detectable differences in their levels. The signal compression amount, which depends upon the combined signal levels, results in a loss in correlation gain during the despreading process. To optimize correlation gain, the signals must maintain their relative ratios that they had at the amplifier input. The invention accomplishes this task by adding a compensation to the combined signals. As a result, after the satellite transponder non-linear action, the signals, rather than being unevenly compressed, are returned to their proper relative levels. This action prevents a loss in correlation gain.

Referring again to FIG. 7, the peak output of the combined signals from non-linear amplifier 50 in Path B is set by level control 51 equal to the peak output of the combined signals in Path C. Each of the outputs of the two paths B and C is detected in detectors 53 so that the modulated RF signals are detected as pulses as shown in FIG. 7. A variable delay line 54 in Path C is used to align the signals in Paths A & C so that they are phase coincident. The detected pulses are digitized by analog-to-digital converters (ADC) 55 that sample the levels at the PN coding rate. The quantization, or number of bits of the ADC, depends upon the allowable quantizing noise. For example, a CDMA system that has 32 carriers will have a maximum of 16 discrete levels after the signals are combined. A 4-bit quantizer can define all 16 levels, but with an uncertainty of $1/32$ of the maximum level. An 8-bit quantizer reduces this uncertainty to $1/512$ of the maximum level and is preferable.

At each PN sequence interval, the two 8 bit numbers of the two quantized pulses are combined to form a 16 bit address. The 16 bit address addresses a programmable read-only-memory (PROM) 60 from which an eight bit value is obtained. This 8 bit value is used to modify a digitally controlled attenuator, and change the level of the combined signals in Path A before final amplification land conversion to the satellite transmission frequency. The attenuation amount at each PN sequence interval reduces the level at each PN interval so that after signal compression in the satellite transponder the relation between the combined PN sequence levels are the same as the relation before nonlinear action.

The PROM 60 is programmed with information derived from the gain curve of the non-linear amplifier. One such non-linear gain curve is shown in FIG. 10. For example, a level during an interval that is 0.4 of the maximum level before non-linear amplification, is, after amplification by the non-linear amplifier, at 0.8 of the maximum level. The amplifier gain curve indicates that reducing the system gain before the non-linear amplifier by 6 dB during the interval when the relative ratio between the interval amplitude and the maximum level is 0.4 dB, will decrease that ratio. As a result, after non-linear amplification, the ratio will again be 0.4.

The PROM 60 is addressed by a 16 bit word. The most significant 8 bits are the ratio between the level during a chip interval and the maximum level after non-linear amplification. The least significant 8 bits are the ratio between the level during a chip interval and the maximum level before non-linear amplification. The PROM output is an 8 bit word that digitally controls variable attenuator 61. From the programmed information at the PROM address, the attenuator is modified to reduce the system gain so that the ratio between the level during the interval and the maximum level is compensated, and the ratio of the two levels after the non-linear transponder repeater is returned to its desired ratio. Although the PROM has more than 64,000 addresses, few of the addresses can actually occur and be used.

The signal to the variable attenuator 61 is delayed by delay circuit 57 so that the attenuation change occurs exactly at the correct chip interval. This delay compensates for circuit delays in Paths B and C which contain the circuitry that calculates the address for the attenuator. One significant delay is the time for addressing and reading the PROM. This delay can, in preferred embodiments, be maintained in the range of about 10 to about 20 nanoseconds. A fast acting PIN diode attenuator can be used for the variable attenuator. The output of the attenuator is amplified and then converted to the transmission band by mixer 58. The converted signals are amplified by a linear high powered amplifier (HPA) 59 and routed to the antenna for transmission to the satellite.

The expanded CDMA signals are received by the transponder. In the transponder, the non-linear action compresses the expanded combined levels and the combined signals are returned to their desired pre-distortion ratios.

Figure 12:
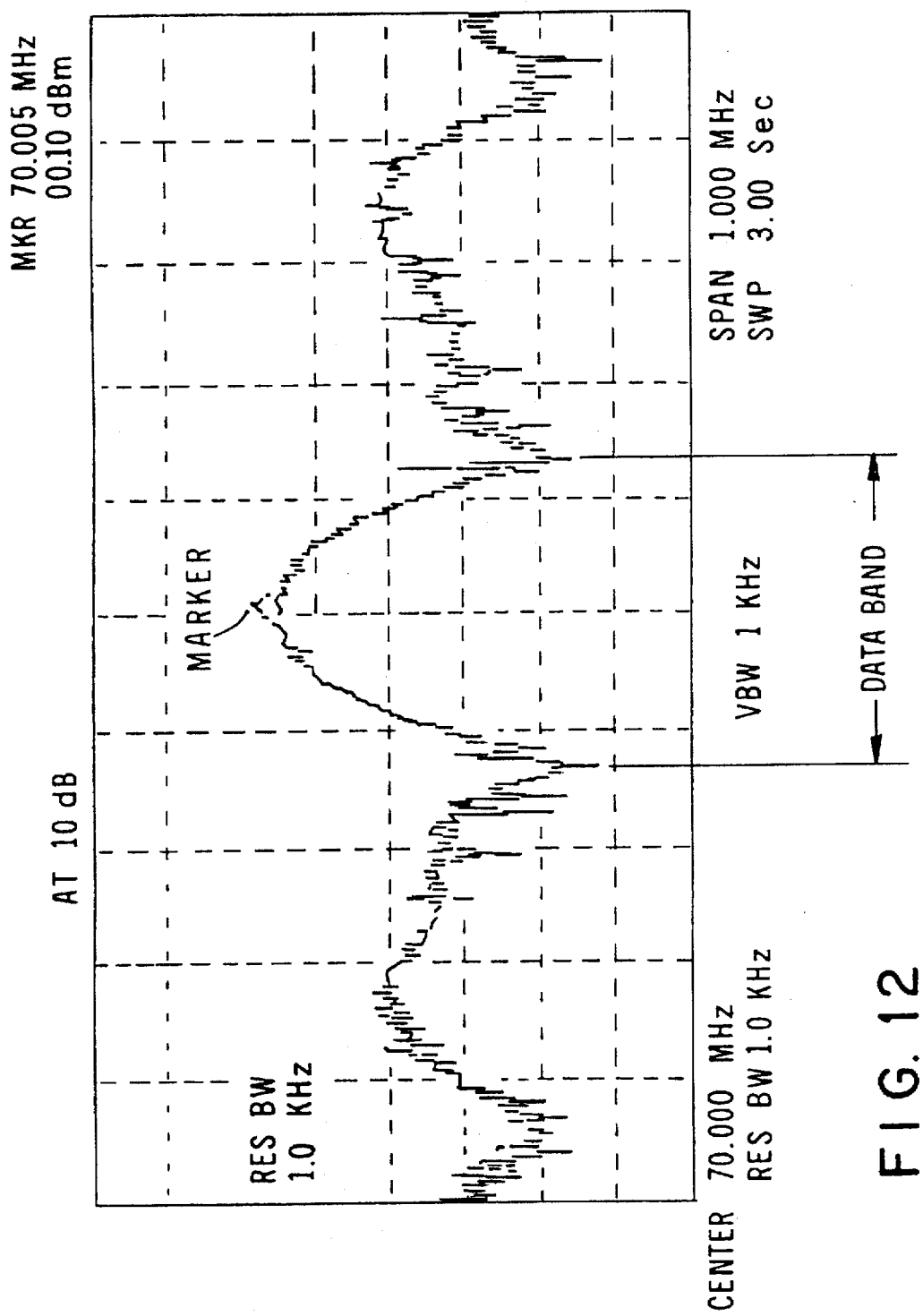

The CDMA ground station, shown in FIG. 11, receives the CDMA signals in antenna 70, amplifies the signals in low noise amplifier (LNA) 71, and then converts the high frequency RF band to a lower intermediate frequency (IF) band. The latter action is performed in converter 76 using local oscillator 77. In mixer 72 the IF signals are mixed with a generated PN sequence matched to one of the spread CDMA signals. The mixer output is divided by splitter 73 into two paths. One path forwards the signals to a demodulator that locks the generated PN sequence to the PN sequence of one of the received CDMA signals. After achieving PN lock in demodulator 74, mixer 72 despreads the signal that was spread with the PN sequence. The despreading action results in a BPSK waveform shown in FIG. 12. The ground station combined signal level is slowly varied by variable attenuator 56 (FIG. 7) to maximize the BPSK signal level. This level is observed on spectrum analyzer 75. At optimum level setting, the satellite transponder compresses the combined CDMA signal levels to compensate correctly the CDMA signal expansion that occurs in the ground station.

What is claimed is:

1. A multicarrier, closed loop, satellite communications system comprises at least one satellite, and, at an at least one generally terrestrial location, at least one transmitter and a signal receiver for receiving signals from said at least one satellite said transmitter transmitting a plurality of harmonically-related signal carriers to said at least one satellite, said signal carriers generating inter-modulation noise in at least one non-linear signal repeater located in said at least one satellite, said system also including at said terrestrial location, means for analyzing and for identifying, in signal carriers received from said at least one satellite, a composite noise signal including said inter-modulation noise and a cancellation signal, and means for generating and adding to said transmitted signal carriers, said cancellation signal optimized to minimize said inter-modulation noise when added to said signal carriers.

2. The system of claim 1 further comprising, a signal generator that generates signals that are opposite in phase to, but are in all other respects substantially the same as, said inter-modulation noise.

3. The system of claim 2 further comprising, on each of said at least one satellite, a transmitter for transmitting said plurality of harmonically-related signal carriers to said transmitter at said at least one generally terrestrial location, said transmitter at said generally terrestrial location further comprising means for adjusting the phase and amplitude of said cancellation signal to approximately the same amplitude and opposite phase of said inter-modulation noise.

4. In a closed loop, multicarrier satellite communications system that includes at least one satellite with at least one non-linear signal repeater, and, located at least one terrestrial location, a signal receiver for receiving signals from said at least one satellite, and at least one transmitter that transmits a plurality of harmonically-related signal carriers to said at least one satellite, said signal carriers generating inter-modulation noise in said at least one non-linear signal repeater;

a method comprising receiving said plurality of harmonically-related signal carriers at said at least one terrestrial location, analyzing said plurality of harmonically-related signal carriers to identify a composite noise signal including said inter-modulation noise and a cancellation signal, and adding to said plurality of harmonically-related signal carriers, at said terrestrial location, a cancellation signal, derived from said analyzing, that minimizes the identified inter-modulation noise when added to said plurality of harmonically-related signal carriers.

5. The method of claim 4 further comprising generating said cancellation signal opposite in phase to, but in all other respects substantially the same as, said inter-modulation noise.

6. The method of claim 5 further comprising adjusting as necessary, based on said analyzing, the phase and amplitude of said cancellation signal to approximately the same amplitude and opposite phase of said inter-modulation noise.

\* \* \* \* \*